(12) United States Patent
Takemura et al.

(10) Patent No.: US 6,236,040 B1
(45) Date of Patent: *May 22, 2001

(54) IMAGE FORMING APPARATUS

(75) Inventors: Kouichi Takemura; Yoshitaka Murakawa; Hiroyuki Matsuo; Takao Sugano; Kazuki Ogawa; Fumio Kaneko; Yukihiro Matsushita, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/904,632

(22) Filed: Aug. 1, 1997

(30) Foreign Application Priority Data

Mar. 17, 1997 (JP) .................................................. 9-063270

(51) Int. Cl.[7] ........................................................ H01J 3/14
(52) U.S. Cl. ........................... 250/235; 358/474; 347/241
(58) Field of Search ................................ 250/208.1, 236, 250/235; 347/243, 244, 238, 235, 241

(56) References Cited

U.S. PATENT DOCUMENTS

| | | | |
|---|---|---|---|
| 5,299,049 | * | 3/1994 | Saito et al. ............................ 359/196 |
| 5,416,505 | * | 5/1995 | Eguchi et al. ......................... 347/244 |
| 5,724,087 | * | 3/1998 | Sugano et al. ........................ 347/243 |
| 5,786,594 | * | 7/1998 | Ito et al. ................................ 250/236 |
| 5,883,385 | * | 3/1999 | Takahashi et al. .................... 250/235 |
| 5,926,203 | * | 7/1999 | Shimura et al. ...................... 347/238 |

FOREIGN PATENT DOCUMENTS

| | | |
|---|---|---|
| 60166916 | 8/1985 | (JP) . |
| 61245174 | 10/1986 | (JP) . |
| 6321763 | 9/1988 | (JP) . |

* cited by examiner

Primary Examiner—Que T. Le
Assistant Examiner—Thanh X. Luu
(74) Attorney, Agent, or Firm—Armstrong, Westerman, Hattori, McLeland & Naughton, LLP (57) ABSTRACT

An image forming apparatus includes a plurality of light sources emitting beams of light, a photoconductor, a scanner for reflecting the beams of light emitted by the light sources to scan the photoconductor periodically, a light detector for receiving the beams of light from the scanner to determine a beam pitch between the beams of light, the light detector being provided in a part of an optical path between the scanner and the photoconductor, a beam shifter for shifting the beams of light incident on the scanner from the light sources, and a controller for operating the beam shifter so that the beam pitch determined by the light detector becomes a predetermined value.

11 Claims, 12 Drawing Sheets

IMAGE FORMING APPARATUS

BACKGROUND OF THE INVENTION

1. Field of the Invention

The present invention relates to image forming apparatus, more particularly, to copiers and printers forming images using a plurality of laser beams.

2. Description of Related Arts

In the conventional image forming apparatus using laser beams, scanning means scans an object surface (a photoconductor) with a plurality of laser beams emitted from a light source to form latent images, and a beam-pitch detector is provided between the light source and the scanning means for correcting a beam pitch (a distance between beams) (see Japanese Examined Patent Publication No. Hei6(1994)-94215, Japanese Unexamined Patent Publication No. Sho63(1988)217763, Japanese Unexamined Patent Publication No.Sho60(1985)-166916).

In such image forming apparatus, however, since the beam-pitch detector is placed between the light source and the scanning means, it is impossible to detect a change of the beam pitch which may occur in an optical path from the scanning means to the scanned surface due to thermal expansion of an optical system or other causes. Thus, the beam pitch cannot be sufficiently corrected, and sometimes normal images cannot be formed.

SUMMARY OF THE INVENTION

The present invention provides an image forming apparatus comprising a plurality of light sources emitting beams of light, a photoconductor, scanning means for reflecting the beams of light emitted by the light sources to scan the photoconductor periodically, a light detector for receiving the beams of light from the scanning means to determine a beam pitch between the beams of light, the light detector being provided in a part of an optical path formed between the scanning means and the photoconductor, beam shift means for shifting the beams of light incident on the scanning means from the light sources, and control means for operating the beam shift means so that the beam pitch determined by the light detector becomes a predetermined value.

DESCRIPTION OF THE PREFERRED EMBODIMENTS

The plurality of light sources in the present invention means two or more light sources. As the number of light sources increases, image density and image forming speed (i.e., printing speed) are improved. Generally, the number of light sources may preferably be six or eight.

The light source in the invention is an electricity-light converter, that is, a device emitting light modulated with an electric signal. An example of such light sources may be a combination of a laser diode with an optical element such as a collimator lens.

The light sources may include the light source package disclosed in our co-pending U. S. Patent Application entitled "LIGHT SOURCE PACKAGE AND IMAGE FORMING APPARATUS USING THE SAME" filed on May 22, 1997 corresponding to Japanese Pat. Application No. Hei9(1997)-003107, herein incorporated by reference.

The photoconductor may be those used for usual electrophotographic copiers and laser printers, that is, a drum or belt of a material having the property of bearing electrical charges uniformly on the surface and losing electrical charges when exposed to light.

As the scanning means for reflecting the beams of light emitted from the light sources to scan the photoconductor periodically, a rotating polygonal mirror may be used, for example.

In order to modulate the beams of light by a signal including an image signal in synchronization with the scanning by the scanning means during printing, it may be possible to use means for switching the beams of light between ON and OFF corresponding to a serial binary signal (including a video signal) while the plural beams of light pass on the photoconductor with scanning the same in parallel. For this purpose, it is preferred to use an ON-OFF switching circuit for switching current or voltage supplied to the light source to ON or OFF, or an optical shutter for switching the beams of light from the light sources to ON or OFF.

The light detector for receiving the beams of light reflected by the scanning means to determine the beam pitch between the beams of light is provided between the scanning means and the photoconductor. The light detector receives a plurality of beams of light and determines the positions of the beams of light and beam pitches. For example, the light detector may be an array of light-receiving elements or a CCD-type line sensor which is provided perpendicularly to the direction of scanning.

The light detector provided in a part of the optical path formed between the scanning means and the photoconductor may be a light detector which is so positioned that it receives, in place of a part of the photoconductor, the plural beams of light for scanning that are reflected by the scanning means in the shape of a fan.

Preferably, the beam shift means is provided between the scanning means and each of the light sources. The beam shift means may be made up of an optical element which changes the beam pitch between the beams of light directing from the light sources to the scanning means, such as a glass plate, a prism, and a mirror which reflects a beam of light or lets it pass through, and an actuator for rotating or displacing the optical element.

The control means receives the beam pitches determined by the light detector and operates the beam shift means to correct the beam pitches to a predetermined value. The control means may be made up of a microcomputer having a built-in CPU, ROM, RAM and I/O port.

Preferably, the light detector is disposed so that the length of an optical path from the scanning means to the light detector equals the length of an optical path between the scanning means and the photoconductor, and accordingly determines beam pitches equivalent to those on the photoconductor.

The light detector may determine the beam pitches during a time period when the beams of light are maintained at a constant intensity.

Preferably, the control means is provided with a memory for storing the beam pitches determined by the light detector, and operates the beam shift means so that difference between the beam pitches and the predetermined value approaches zero. Also preferably, the light detector determines the beam pitches within a time period when an image is being formed, and the control means operates the beam shift means at a time period other than the image forming time period.

The present invention is now described in detail by way of an embodiment with reference to the accompanying figures. The embodiment, however, should not be understood to limit the scope of the invention.

1. General Construction of a Printer and its Operation

Figure 1:
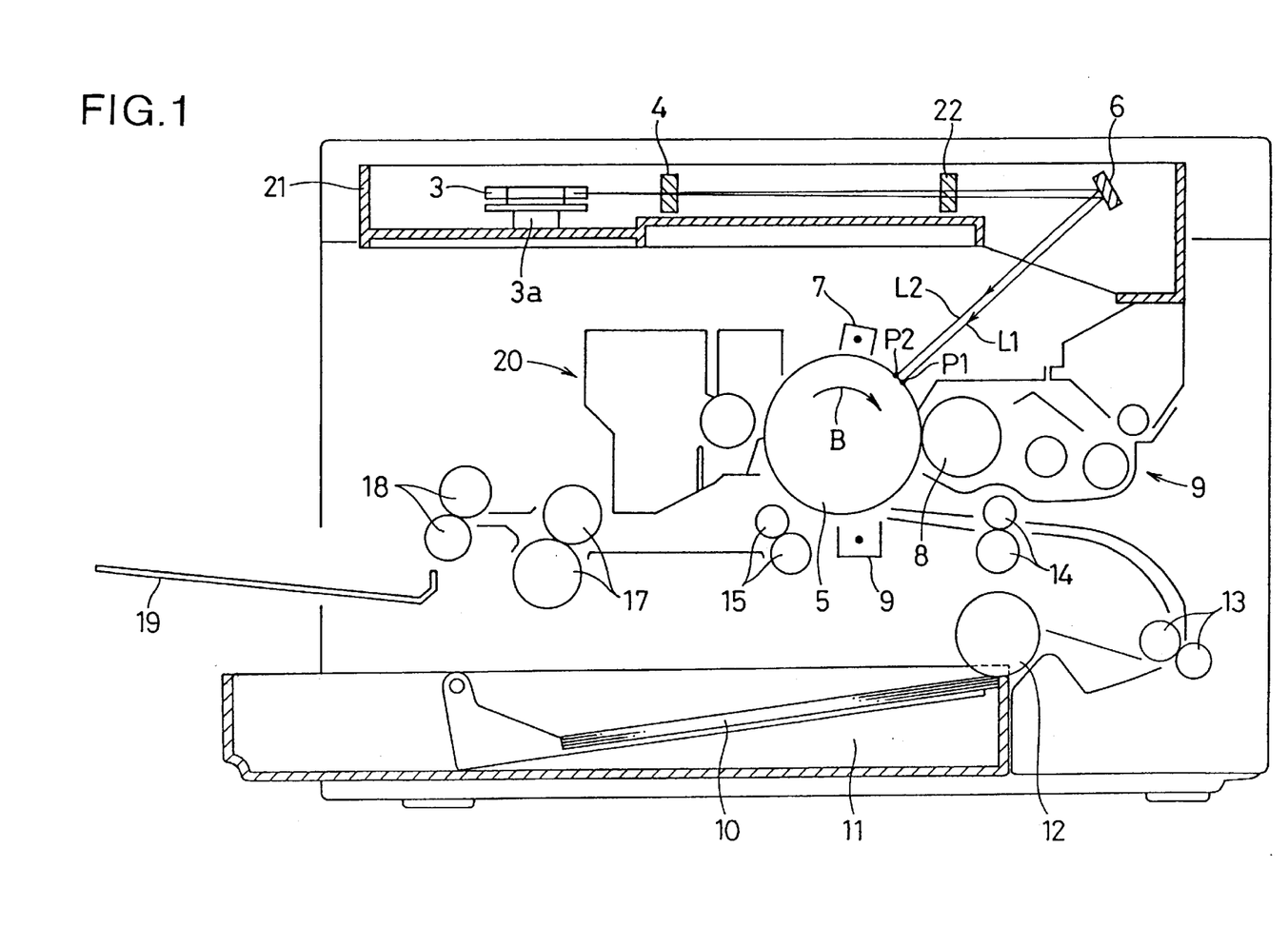
FIG. 1 illustrates a construction of a laser printer in accordance with an embodiment of the present invention.
Figure 2:
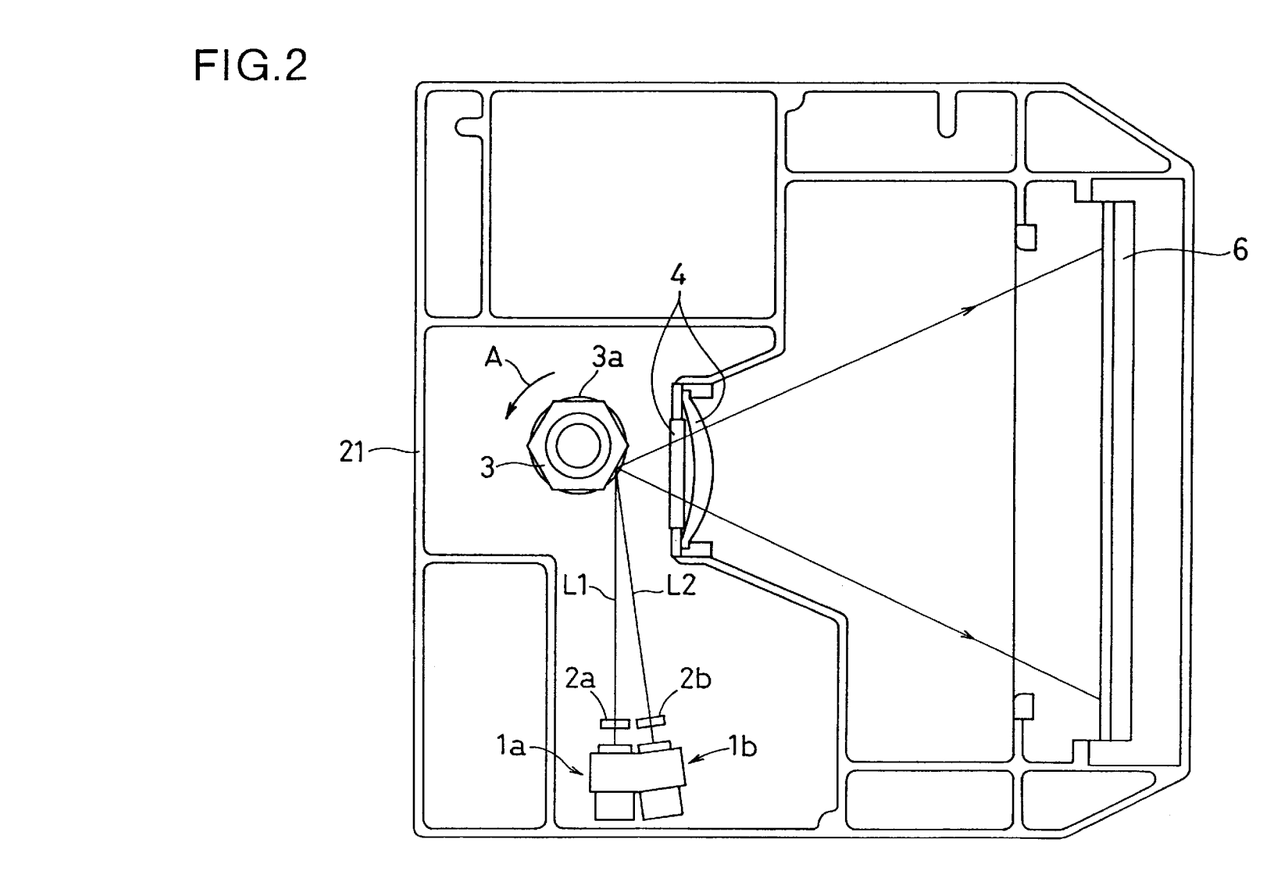
FIG. 2 is a top view illustrating an optical system of the laser printer shown in FIG. 1.
Figure 3:
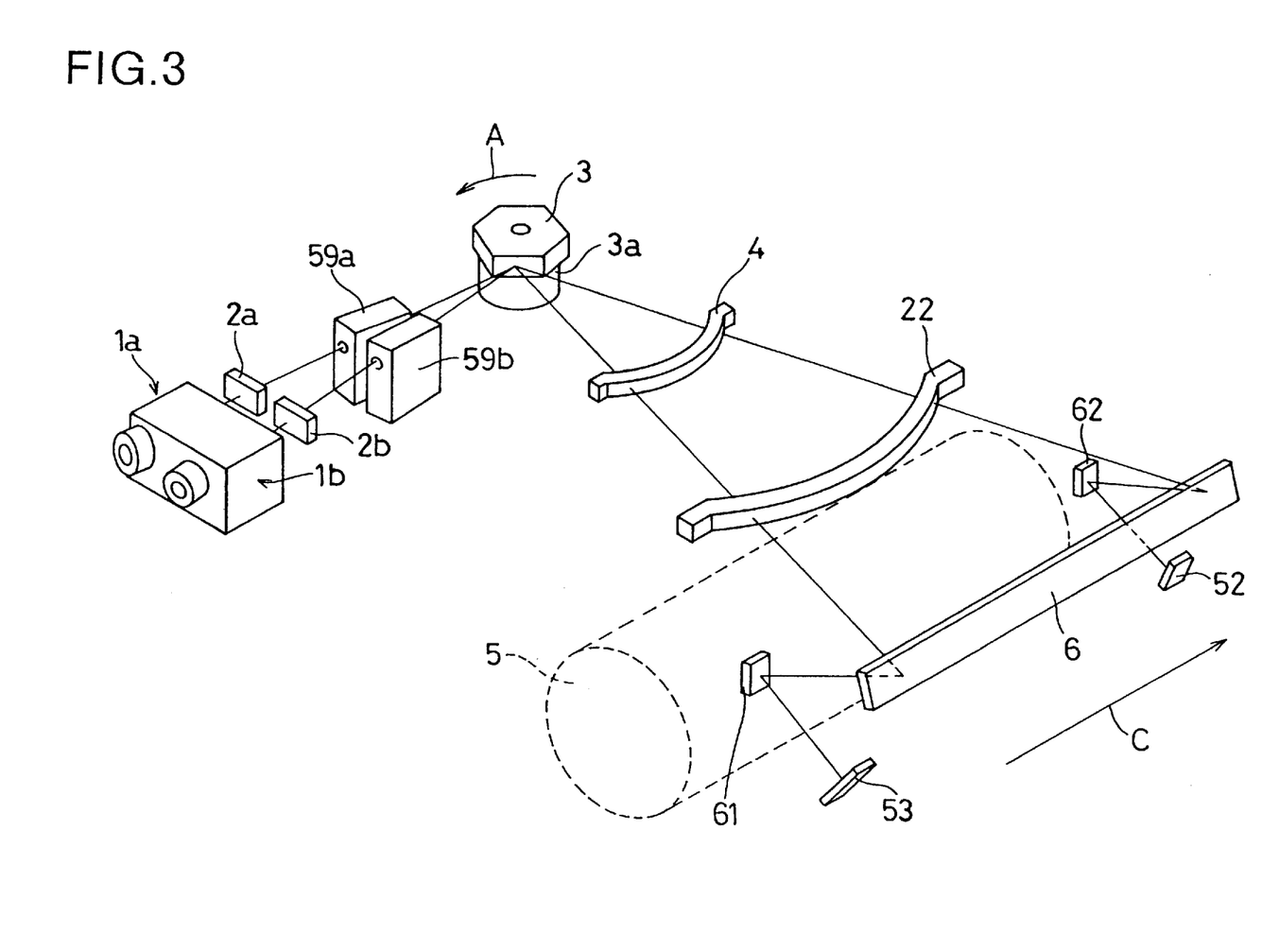
FIG. 3 is a perspective view illustrating the structure of the optical system in FIG. 1.

The general construction of a multi-beam-type laser printer according to the present invention is first explained referring to FIGS. 1 to 3.

FIG. 1 is a cross-sectional side view illustrating the construction of the printer, FIG. 2 is a top view illustrating an optical system of the printer in FIG. 1, and FIG. 3 is a perspective view illustrating the structure of the optical system in FIG. 1.

As shown in these figures, the laser printer includes, inside a housing 21 for its optical system, a pair of light source packages 1a and 1b emitting beams L1 and L2, respectively, each beam corresponding to an input signal, and a cylindrical lenses 2a and 2b for adjusting cross-sectional shape of the two beams L1 and L2 emitted from the light source packages 1a and 1b. The light source packages 1a and 1b incorporate laser diodes for emitting the beams L1 and L2 and collimator lenses for collimating the beams L1 and L2.

Further, the laser printer includes beam shifters 59a and 59b for adjusting directions of optical paths of the beams L1 and L2 from the cylindrical lenses 2a and 2b, a polygonal mirror 3 for reflecting the beams L1 and L2 from the beam shifters 59a and 59b with six mirror faces, a motor 3a for rotating the polygonal mirror 3 in the direction of an arrow A at a predetermined speed, an f·θ lens 4 for compensating for distortional aberration of the beams reflected by the polygonal mirror 3, a cylindrical lens 22 (which also has the function of F·θ) for compensating for agitation of the beams L1 and L2 due to uneven angles of the mirror faces of the polygonal mirror 3 with respect to the horizontal, and a plane mirror 6 for reflecting the beams passing through the f·θ lens 4 and the cylindrical lens 22 and focusing the beams at positions P1 and P2 on a photoconductive drum 5.

The polygonal mirror 3 scans the photoconductive drum 5 in the direction of an arrow C by being rotated in the direction of the arrow A. At the beginning of each scanning, the beams L1 and L2 are received via a mirror 61 by a beam sensor 53 made up of a photodiode and, at the end of each scanning, the beams L1 and L2 are received via a mirror 62 by a CCD sensor 52 as a light detector. These elements are placed in such arrangement.

The length of an optical path between the polygonal mirror 3 and the photoconductor 5 is set equal to that between the polygonal mirror 3 and the CCD sensor 52. The CCD sensor 52 is placed so as to receive the beams L1 and L2 at a position corresponding to the photoconductor 5.

Further, as shown in FIG. 1, the printer is provided with a corona discharger 7 for uniformly charging beforehand the surface of the photoconductive drum 5 rotating in the direction of an arrow B, a developing unit 9 for supplying a developer by means of a developer roller 8 onto the surface of the photoconductive drum 5, a cassette 11 for storing recording sheets 10, a feeding roller 12 for feeding the recording sheet in the cassette 11, a pair of transport rollers 13 for transporting the recording sheet, a resistance roller 14 for intermittently transporting the recording sheet toward the photoconductive drum 5 at a predetermined timing, a image transfer corona discharger 9 for charging the recording sheet transported by the resistance roller 14 by corona discharge and transferring an image developed on the photoconductive drum 5 onto the surface of the recording sheet, a pair of separation rollers 15 for separating the recording sheet having the transferred image from the photoconductive drum 5, a pair of fixing rollers 17 for fixing by heating the image on the separated recording sheet, an ejection roller 18 for ejecting the recording sheet after fixing, a tray 19 for receiving the ejected recording sheet and a cleaning unit 20 for cleaning the surface of the photoconductive drum 5 from which the image has been transferred.

The overall operation of a printer thus constructed is now described.

As shown in FIGS. 2 and 3, the beams L1 and L2 emitted from the light source packages 1a and 1b are reflected by the polygonal mirror 3 rotating in the direction of the arrow A, and are first received via the f·θ lens 4, the cylindrical lens 22 and the plane mirror 6 by the beam sensor 53. The beams L1 and L2 are focused at points Pi and P2 on the surface of the photoconductive drum 5 with scanning the photoconductive drum 5 in the direction of the arrow C as the polygonal mirror 3 is rotated. Lastly, the beams L1 and L2 is received by the CCD sensor 52. In this one scanning cycle, when the beam sensor 53 having received the beams L1 and L2 sends a detection signal to a control system described below, the control system, in synchronization with the detection signal, modulates the beams L1 and L2 with a video signal for a predetermined printing time period. After the end of the printing time period, the control system, on receiving a detection signal from the CCD sensor 52 having received the beams L1 and L2, operates a beam shifter to correct the beam pitch, if necessary.

During the printing time period, the beams L1 and L2 scans the surface of the photoconductive drum 5 uniformly charged in advance by the charging corona discharger 7 which rotates in the direction of the arrow B so as to form a latent electrostatic image on the surface of the photoconductive drum 5. The latent electrostatic image is made to appear by application of the developer using the developer roller 8.

The recording sheet 10 stored in the cassette 11 is transported by the feeding roller 12 and then by the transport rollers 13, and stops temporarily when the leading edge of the recording sheet reaches the resistance roller 14. Then, when the resistance roller 14 is operated in timing with the progress of image development on the photoconductive drum 5, the recording sheet 10 is transported by the resistance roller 14 under the photoconductive drum 5 to become in contact with a developing area of the photoconductive drum 5.

The image transfer corona discharger 9 then discharges on the back side of the recording sheet 10 to transfer the developer forming the positive image on the surface of the photoconductive drum 5 onto the recording sheet (the image is transferred). The recording sheet 10 receiving the transferred image is separated from the photoconductive drum 5 by the separation rollers 15 and transported to the fixing rollers 17.

Then, the recording sheet 10 on which the developer is fixed by heating by the fixing rollers 17 is ejected to the tray 19 by the ejection roller. Thus, a printing cycle for one recording sheet is completed. In addition, the surface of the photoconductive drum 5 is cleaned by the cleaning unit 20 after the transfer of the image so as to prepare for a next printing.

2. Detailed Construction of Essential Elements and their Operation

Now detailed description is given to the construction and operation of essential elements characterizing the present invention, that is, the beam shifter, polygonal mirror, CCD sensor, control system and the like.

Figure 4:
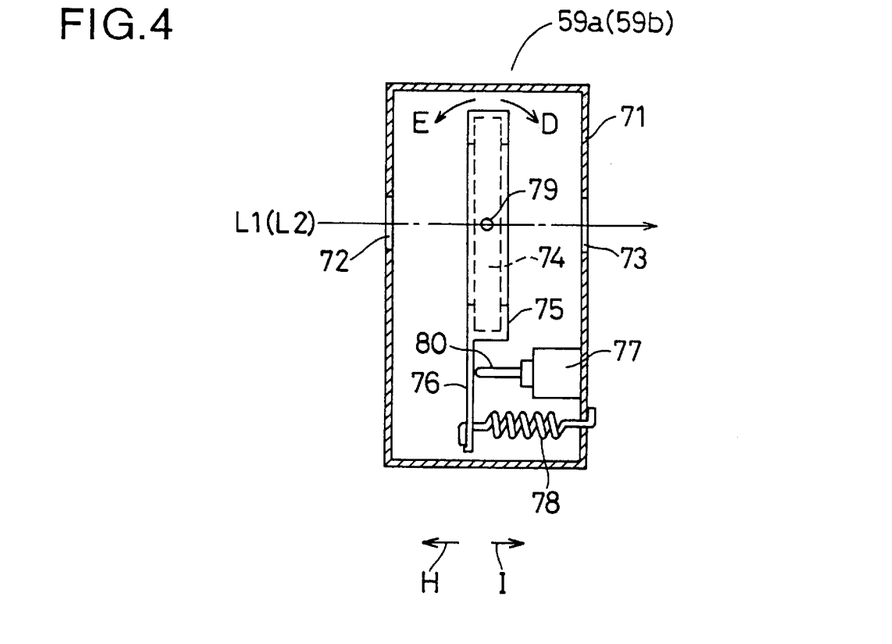
FIG. 4 is a cross sectional view of a beam shifter of the embodiment.

(1) Beam Shifter FIG. 4 is a detailed cross sectional view illustrating the beam shifter 59a. The beam shifter 59b has the same construction as the beam shifter 59a.

The beam shifter 59a has a frame 75 inside a housing 71 with openings 72 and 73. The frame 75 is supported so that it can rotate in the directions of arrows E and D about a support 79 as a center of rotation. A glass plate 74 is fitted to the frame 75.

A spring 78 is provided between a side wall of the housing 71 and an arm 76 extending downward from the frame 75 so as to urge the frame to the direction of the arrow E, while an actuator 77 having a shaft 80 capable of moving to the directions of arrows H and I is also provided.

As the actuator 77, used is a linear stepping actuator (SPS20 manufactured by . . . , Japan) which can move the shaft 80 to the directions of the arrow H and I by a stepping motor.

Figure 5:
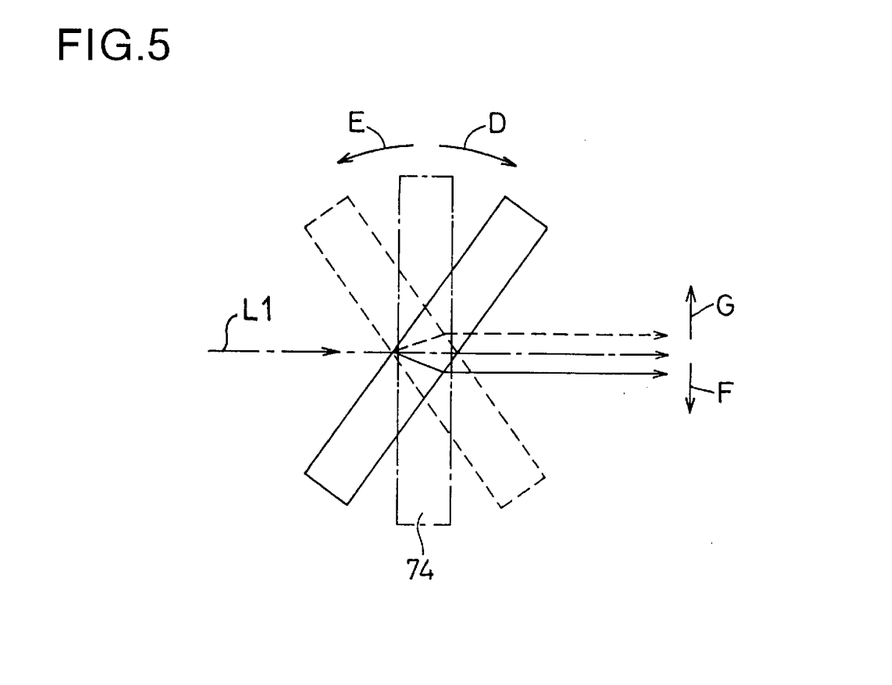
FIG. 5 explains optical action of the beam shifter of the embodiment.

The beam L1 is incident onto the beam shifter 59a having the above construction through the opening 72. In the case where the beam L1 is incident perpendicularly onto the glass plate 74 as shown in FIG. 5, i.e., the incidence angle =0°, the beam L1 is emitted out from the opening 73 without being shifted. However, when the actuator 77 rotatively moves the glass plate 74, the incidence angle changes, and thereby the beamL1 is shifted due to refraction of glass.

More particularly, when the glass plate 74 is rotatively moved to the direction of the arrow D, the beam is shifted to the direction of an arrow F. When the glass plate 74 is rotatively moved to the direction of the arrow E, the beam is shifted to the direction of an arrow F. Thereby, it is possible to adjust a beam pitch between the beams L1 and L2, that is, a distance between the positions P1 and P2 at which the beamsL1 and L2 are incident on the photoconductive drum 5, respectively.

(2) Polygonal mirror

Figure 6:
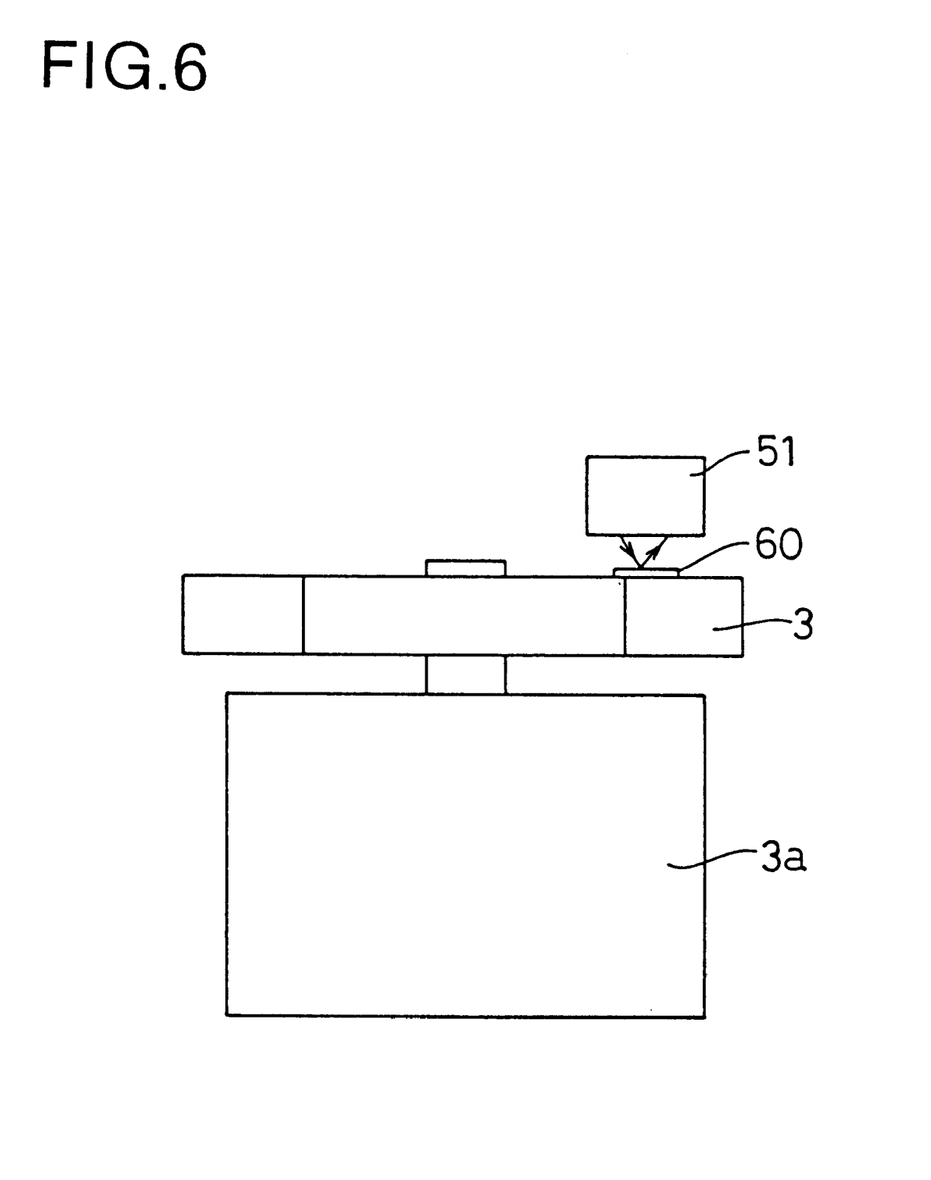
FIG. 6 is a side view illustrating a polygonal mirror of the embodiment in detail.

The polygonal mirror 3 itself is known. As shown in FIG. 6, the polygonal mirror 3 is a rotary hexagonal plate having six mirrors mounted to its surrounding side walls. The polygonal mirror 3 is rotated by a motor 3a. Particularly in the invention, one of the six mirrors is marked as a home position with a reflective plate (or a marking) 60, and a home position sensor 51 is provided above the rotary plate.

The home position sensor 51 emits light to the rotary plate and detects light reflected by the reflective plate 60 to determine the position of the marked mirror, namely the home position of the polygonal mirror 3.

(3) CCD Sensor

Figure 7:
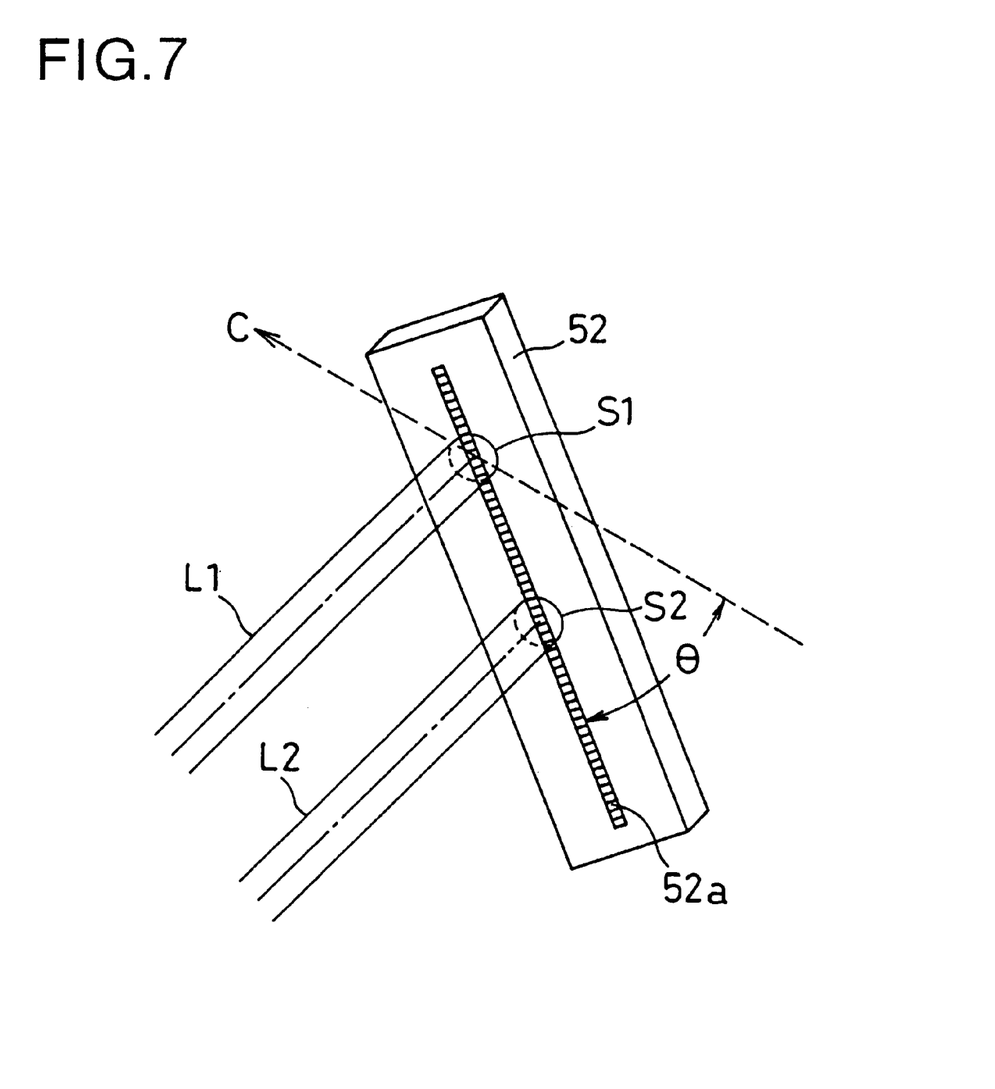
FIG. 7 explains arrangement of a CCD sensor with respect to a beam in accordance with the embodiment.

As the CCD sensor 52, used is a scanning line sensor (TCD1500 manufactured by Toshiba Corporation, Japan) having an array 52a of light-receiving elements aligned in a row at a pitch of 7 μm. As shown in FIG. 7, the CCD sensor 52 is set so that the array 52a of light-receiving elements makes an acute angle θ with respect to the scanning direction of the beams L1 and L2, i.e., the direction of the arrow C, and that the beams L1 and L2 are incident perpendicularly to the array.

The angle made by the array 52a of light-receiving elements and the scanning direction is set to θ for the following reason. Beam spots S1 and S2 formed by the beams L1 and L2 on a light-receiving surface of the CCD sensor 52 have a spot diameter of about 75 μm. Light intensity distribution presents a normal distribution. Therefore, the light intensity distribution of the beam spots S1 and S2 is accurately determined. Thereby the number of light-receiving elements of the CCD sensor determining the beam spots S1 and S2 increases (1/sin θ) times, the accuracy in determining the centers of the beam spots S1 and S2, (i.e., resolving capability) improves (1/sin θ) times. Additionally, in this example, θ is set to 30 degrees for a doubled detection accuracy.

Figure 13:
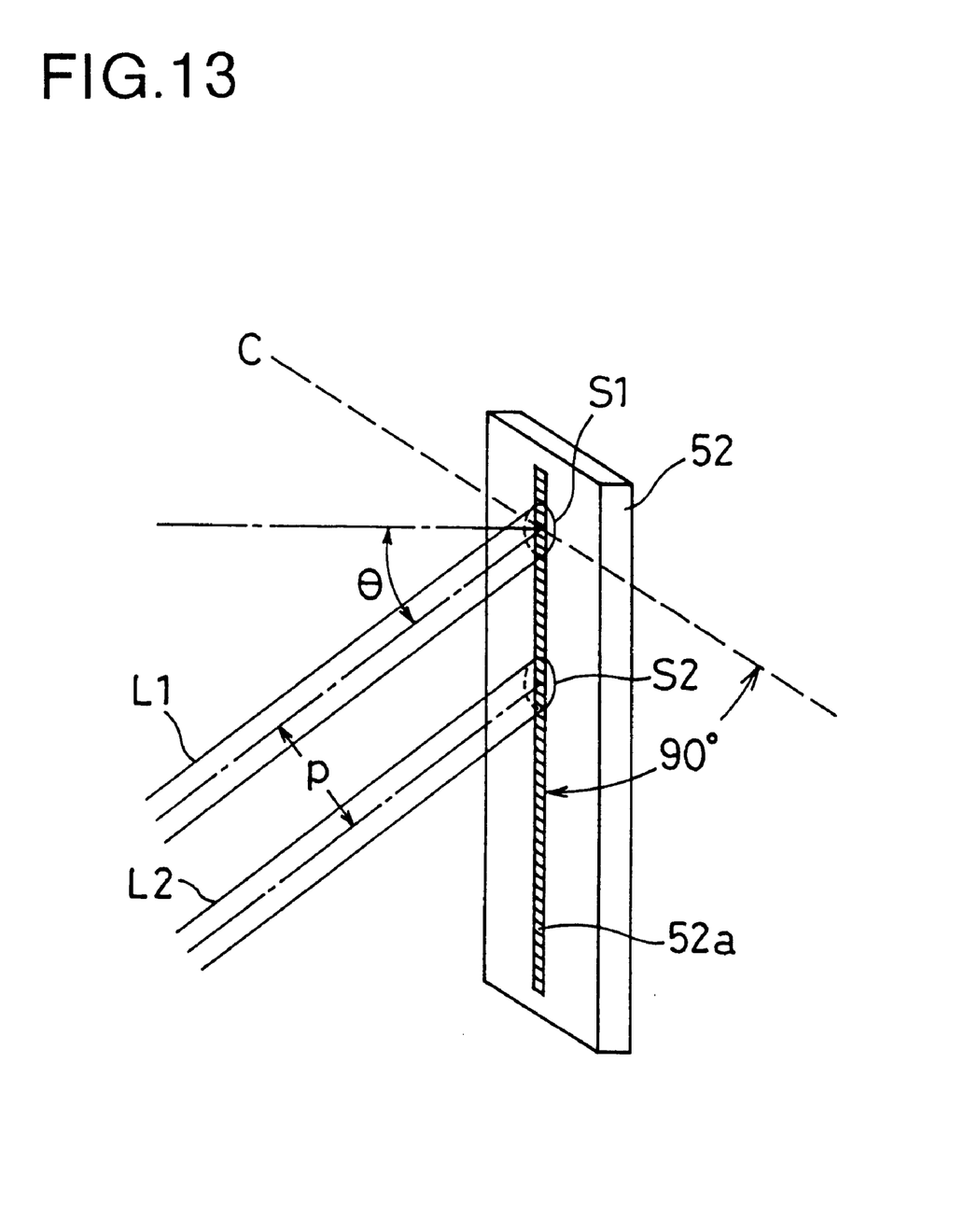
FIG. 13. explains other arrangement of a CCD sensor with respect to a beam in accordance with the embodiment.

Alternatively, as shown in FIG. 13, the CCD sensor 52 may be disposed so that the array 52a of light-receiving elements becomes perpendicular to the scanning direction of the beams L1 and L2, i.e., the direction of the arrow C, and the beams L1 and L2 is incident at an incidence angle of a (90°>α >0°). Thereby, the accuracy in determining the centers of the beam spots S1 and S2 and the beam pitch P can be improved by (1/cos $a$) times.

(4) Control System First, explanation is given to the construction of a control system controlling the optical system of the printer.

Figure 8:
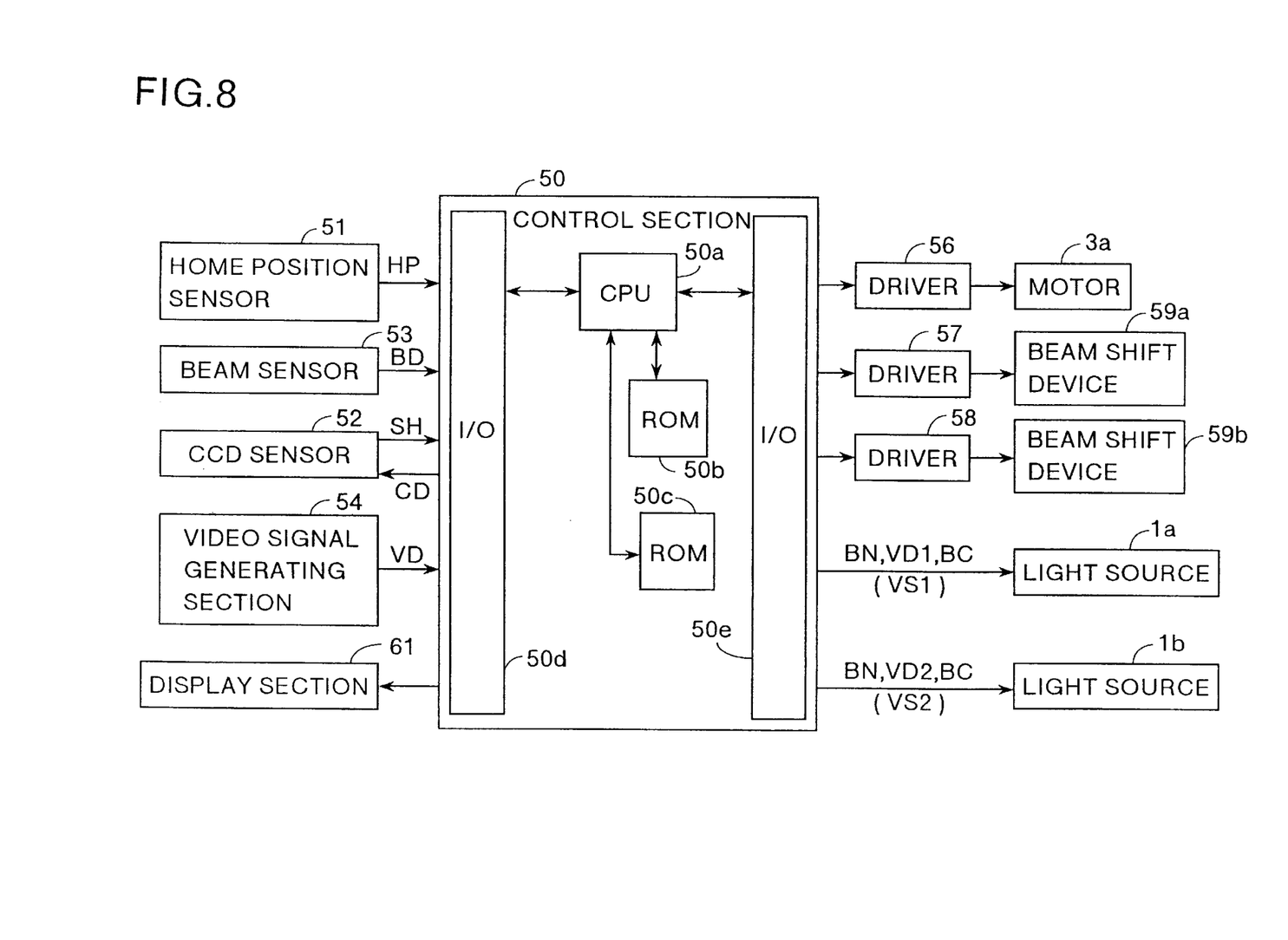
FIG. 8 is a block diagram illustrating a control system of the embodiment.

FIG. 8 is a block diagram illustrating this control system which includes a control section 50 made up of a microcomputer having a CPU 50a, ROM 50b, RAM 50c, and I/O ports 50d and 50e. This control system is provided with a video signal generating section 54 for generating a video signal for printing and a display section 61 for displaying printing conditions, warnings and the like to a user.

The control section 50 receives a detection signal HP from the home position sensor 51 shown in FIG. 6, a detection signal BD from the beam sensor 53 shown in FIGS. 2 and 3, a detection signal CD from the CCD sensor, and an output signal VD from the video signal generating section 54, processes the signals, and produces outputs to a driver 56 which drives the motor 3a for driving the polygonal mirror 3, drivers 57 and 58 for driving the beam shifters 59a and 59b, respectively, the light source packages 1a and 1b, and the display section 61.

Figure 9:
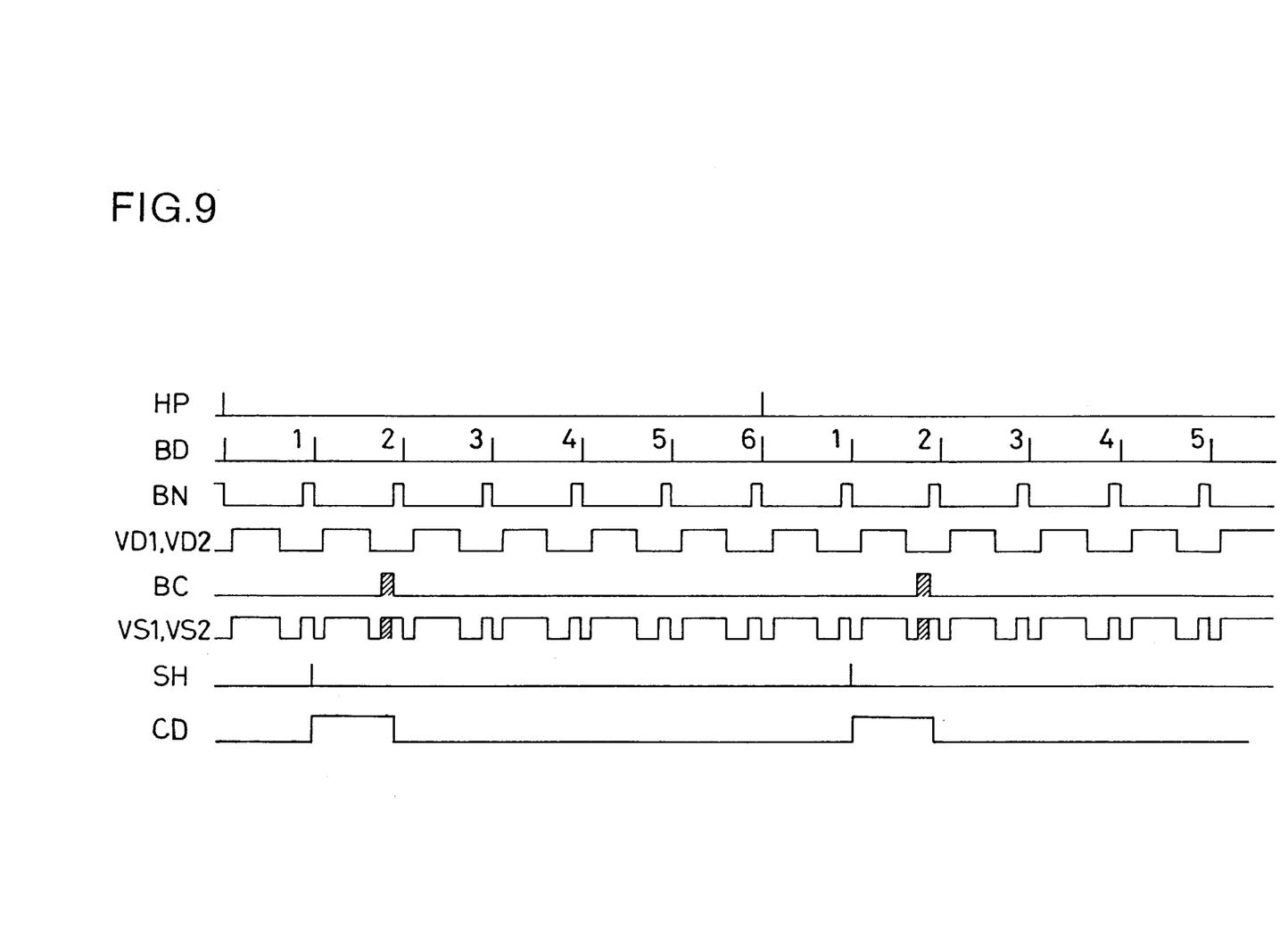
FIG. 9 is a timing chart explaining operation of the control system of the embodiment.
Figure 10:
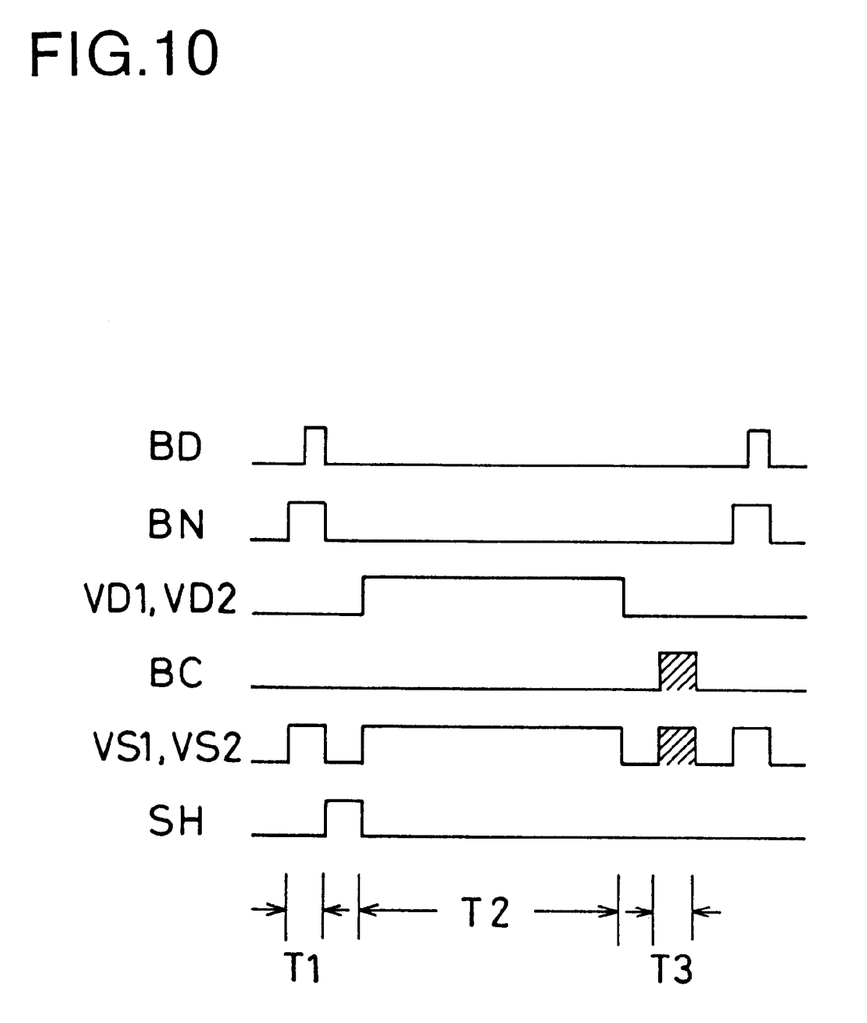
FIG. 10 is an enlarged view of an essential part of FIG. 9.
Figure 11:
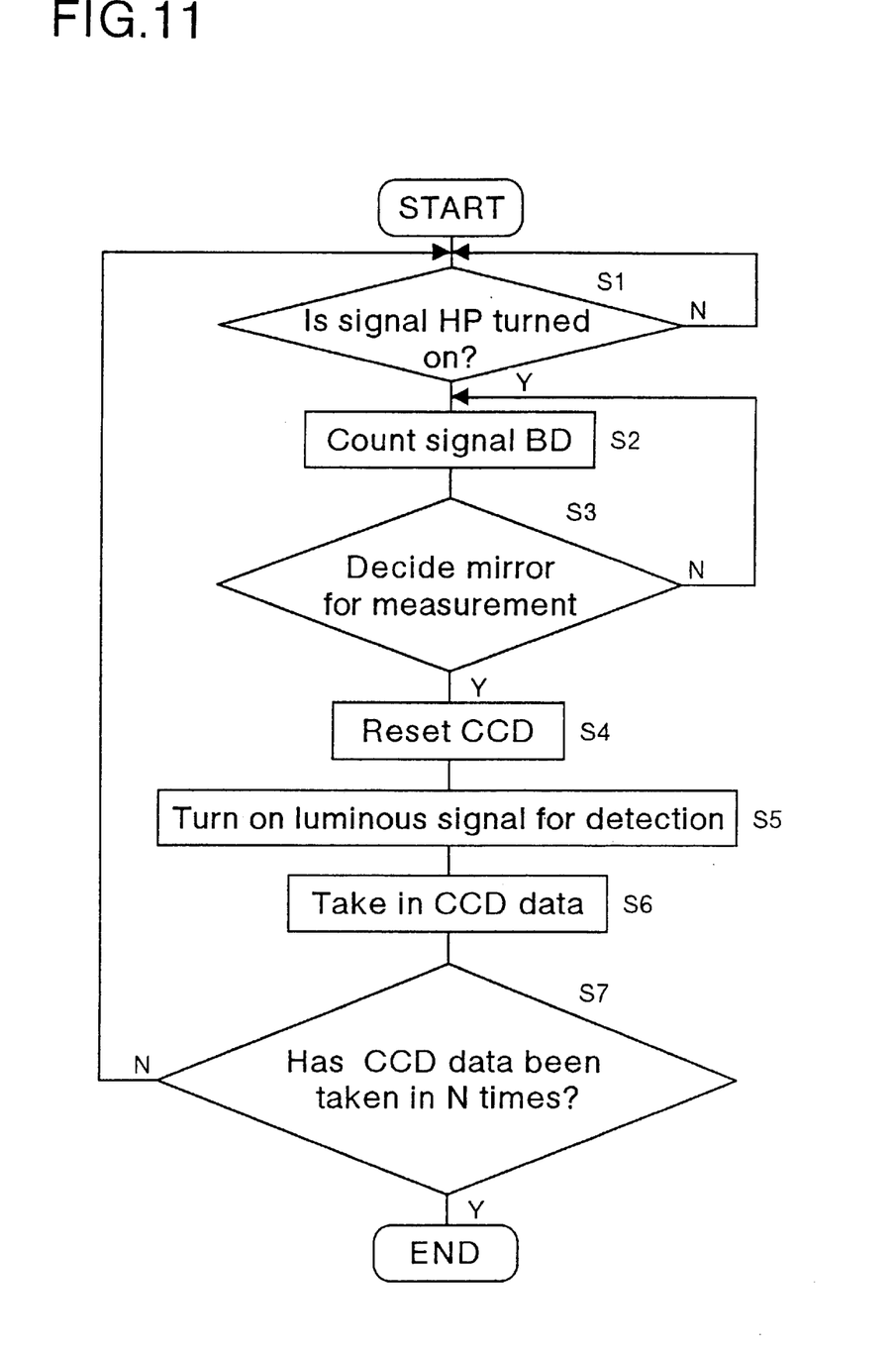
FIG. 11 is a flowchart explaining operation of the control system of the embodiment.

Next, explanation is given to printing operation and beam-pitch determining operation in this control system with reference to timing charts shown in FIGS. 9 and 10 and a flowchart shown in FIG. 11.

When the polygonal mirror 3 is rotated by the motor 3a at a constant speed, a signal BN to allow the light source packages 1a and 1b to produce light is output to the light source packages 1a and 1b by the control section 50 to determine a timing when the scanning starts. The light source packages 1a and 1b produce light of a constant intensity in synchronization with the signal BN.

When the beams L1 and L2 are received by the beam sensor 53, the signal BD is input from the beam sensor 53 to the control section 50. The control section 50 switches the signal BN to OFF. A predetermined time later, the control section 50 converts the video signal VD for printing from the video signal generator 54 into serial video signals VD1 and VD2 for one scanning, and outputs the converted signals to the light source packages 1a and 1b. In FIGS. 8 to 10, the signals input to the light source packages 1a and 1b are indicated as signals VS1 and VS2.

The light source packages 1a and 1b produce light beams for printing modulated by the video signals VD1 and VD2, and the polygonal mirror 3 scans a printing area of the photoconductive drum 5 with these light beams. This scanning is repeated to form an electrostatic latent image on the photoconductive drum 5.

While the printing operation is being performed as described above, if the signal HP from the home position sensor 51 turns ON (Step S1) as shown in FIG. 11, the control section 50 counts the number of signals BD from this point of time. When the number of signals BD reaches a predetermined number n (n=1 in this example), one of the six mirrors corresponding to the number is decided as a surface for determining the beam pitch (Steps S2 and S3 in FIG. 11).

At the same time, a reset signal SH from the control section 50 resets the CCD sensor 52 (a light-reception signal already stored in the array 52a of light-receiving elements is temporarily transferred to a resister contained in the CCD sensor, and then is output to the control section 50).

After completion of the scanning of the printing area by the video signals VD1 and VD2, a light-producing signal BC for producing light for determining the beam pitch turns to ON for a predetermined time period, the light source packages 1a and 1b produce the beams L1 and L2 at a constant intensity for the ON time period (Steps S4 and S5).

The beams L1 and L2 are received by the array 52a of light-receiving elements of the CCD sensor 52 by the mirror 62 to be stored as detection signals, and are output as the signal CD to the control section 50 at the next reset signal SH. In other words, as shown in FIG. 10, the beam sensor 53 detects the timing of the start of scanning in a time period T1, the printing scanning is performed in a time period T2, and the positions of the beams are determined in a time period T3.

Here, the beams L1 and L2 form beam spots of about 75μm in diameter on the CCD sensor 52 as described above. The light intensities thereof present a normal distribution. Accordingly, the signal CD represents a light intensity distribution data of the beams L1 and L2 on the array 52a of light-receiving elements, is output as a serial signal from the CCD sensor 52, and is stored in the RAM 50c (Step S6). Operation from Step S1 to Step S6 is repeated until the signal CD is taken into the RAM 50c predetermined times, e.g., N times. Then, the operation of determining the positions of the beams and the beam pitch comes to an end (Step S7).

Figure 12:
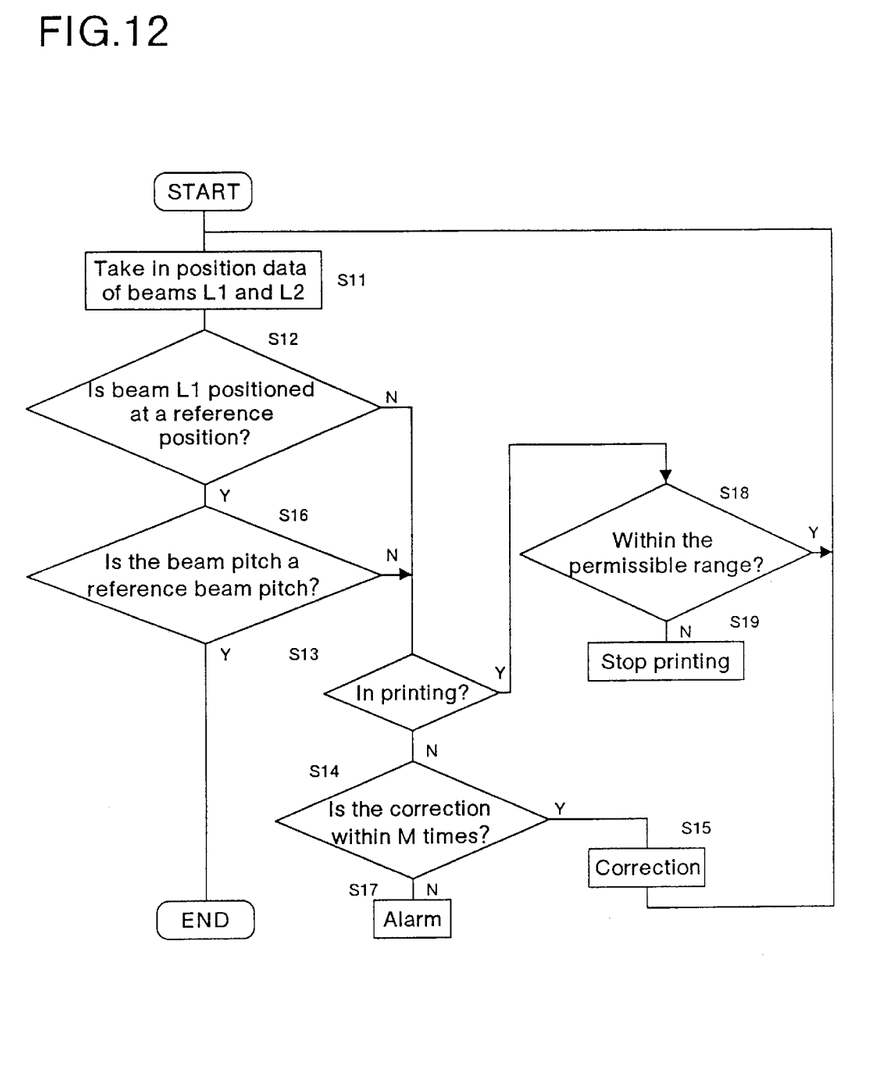
FIG. 12 is a flowchart explaining operation of the control system of the embodiment.

Next, explanation is given to operation of correcting the beam pitch with reference to a flowchart shown in FIG. 12.

When N-time take-ins of positional data on the beams L1 and L2 as shown in the flowchart in FIG. 11 is completed (Step S11), the control section 50 decided, for each of the beams L1 and L2, a position showing the maximum sum of light intensities from the light intensity distribution taken Times as the central position of the beam (referred to simply as a position hereafter).

Difference between the position of the beam L1 and a preset reference position is calculated. During a time period when the laser beam printer is not printing (e.g., during a warming-up of the laser printer, after completing or interrupting printing), if the number of corrections till that time is within predetermined M times (Steps S 13 and S14), the beam shifter 59a is driven according to the calculated positional difference to correct the position of the beam L1.

Subsequently, positional data on the beams L1 and L2 is taken again (Step Sil). If the position of the beam L1 agrees with the reference position (Step S12), difference of the beam pitch between the beams L1 and L2 is calculated against a reference beam pitch. During the time period when the laser beam printer is not printing, if the number of corrections till that time is within the M times (Step S14), the beam shifter 59b is driven according to the calculated beam pitch difference to correct the position of the beam L2.

Then, positional data on the beams L1 and L2 is taken again. If the beam pitch between the beams L1 and L2 agrees with the reference beam pitch (Step S16), the correction operation is finished.

On the other hand, in Step 14, if the number of corrections exceeds the M times, the control section 50 judges the correction to be impossible and displays the judgment as an alarm on the display section 61 (Step S17). Further, in Step 13, if the difference between the position of the beam L1 and the reference position or the beam pitch between the beams L1 and L2 exceeds an acceptable value, the control section 50 stops the printing operation (Steps S18 and S19).

In this way, the position of the beam 1 and the beam pitch between the beams L1 and L2 are corrected.

The above-described operation of the control section 50 is performed by the CPU 50a based on programs pre-stored in the ROM 50b. Alternatively, in the optical system, the beam sensor 53 may be replaced with the CCD sensor 52, which serves to detect both the timing of the start of scanning and the positions of the beams.

According to the present invention, the light detector determining beam-pitches is placed in an optical path from the scanning means to the photoconductor to substantially detect the beam pitches equals to those on the photoconductor. Therefore, even if the beam pitches change due to thermal expansion of the optical system or other causes, the beam pitches are suitably corrected, and thereby normal images can always be formed.

What is claimed is:

1. An image forming apparatus which performs image formation for a medium during a first time period and stands by for next image formation for another medium during a second time period, comprising:

a plurality of light sources emitting beams of light;

a photoconductor;

scanning means for reflecting the beams of light emitted by the light sources to scan the photoconductor periodically;

a light detector for receiving the beams of light from the scanning means to determine a beam pitch between the beams of light, the light detector being provided in a part of an optical path between the scanning means and the photoconductor;

beam shift means for shifting the beams of light incident on the scanning means from the light sources; and control means for operating the beam shift means so that a difference between the beam pitch and a predetermined value of the beam pitch approaches zero, wherein said light detector determines the beam pitch during the first time period, and said control means operate said beam shift mean at the second time period.

2. The image forming apparatus according to claim 1, wherein the beam shift means comprises a transparent plate letting a beam of light pass through and an actuator for changing an incidence angle of the beam of light with respect to the plate.

3. The image forming apparatus according to claim 1, wherein the light detector is disposed so that the length of an optical path from the scanning means to the light detector equals the length of an optical path between the scanning means and the photoconductor, and determines a beam pitch equivalent to that on the photoconductor.

4. The image forming apparatus according to claim 1, wherein the light detector determines the beam pitch during a time period when the beams of light are maintained at a constant intensity.

5. The image forming apparatus according to claim 1, wherein the control means comprises a memory for storing the beam pitch determined by the light detector and operates the beam shift means so that difference between the beam pitch and the predetermined value approaches zero.

6. The image forming apparatus according to claim 1, wherein the light detector comprises a CCD sensor capable of receiving all the beams of light at the same time.

7. An image forming apparatus which performs image formation for a medium during a first time period and stands by for next image formation for another medium during a second time period comprising:

a plurality of light sources emitting beams of light;

a photoconductor;

scanning means for reflecting the beams of light emitted by the light sources to scan the photoconductor periodically;

a light detector for receiving the beams of light from the scanning means to determine positions of the beams of light, the light detector being provided in a part of an optical path between the scanning means and the photoconductor;

beam shift means for shifting the beams of light incident on the scanning means from the light sources; and control means for operating the beam shift means at the second time period so that one of the beam positions determined by the light detector agrees with a reference position.

8. The image forming apparatus according to claim 7, wherein the control means determines a beam pitch based on the determined beam positions and operates the beam shift means so that the determined beam pitch agrees with a reference pitch after the one of the beam positions agrees with the reference position.

9. The image forming apparatus according to claim 7, wherein the beams of light emitted from the light sources alternatively include a first beam modulated by a video signal and a second light beam having a constant intensity, the first light beam being directed to the photoconductor, the second light beam being directed to the light detector.

10. The image forming apparatus according to claim 7, wherein the scanning means includes a rotating member having a plurality of mirrors and the light sources emit the beams of light to the light detector through a selected one of the mirrors.

11. The image forming apparatus according to claim 7, further comprising alarm means for raising an alarm when the control means operates the beam shift more than a predetermined number of times.

* * * * *